United States Patent
Lenze et al.

(10) Patent No.: US 11,208,524 B2
(45) Date of Patent: Dec. 28, 2021

(54) HYBRID ANIONIC, NONIONIC WATER-BASED POLYURETHANE-POLYUREA

(71) Applicant: U.S. POLYMERS-ACCUREZ, St. Louis, MO (US)

(72) Inventors: Matthew Joseph Lenze, St. Louis, MO (US); Robert J. Gaal, St. Louis, MO (US); Vishal Muralidharan, St. Louis, MO (US)

(73) Assignee: U.S. POLYMERS-ACCUREZ, St. Louis, MO (US)

(*) Notice: Subject to any disclaimer, the term of this patent is extended or adjusted under 35 U.S.C. 154(b) by 0 days.

(21) Appl. No.: 16/695,502

(22) Filed: Nov. 26, 2019

(65) Prior Publication Data

US 2021/0155746 A1    May 27, 2021

(51) Int. Cl.
| | |
|---|---|
| *C08G 18/75* | (2006.01) |
| *C08G 18/12* | (2006.01) |
| *C08G 18/08* | (2006.01) |
| *C08G 18/22* | (2006.01) |
| *C08G 18/32* | (2006.01) |
| *C09D 175/08* | (2006.01) |
| *C09D 175/02* | (2006.01) |
| *C08G 18/34* | (2006.01) |
| *C08G 18/48* | (2006.01) |

(52) U.S. Cl.
CPC ....... *C08G 18/755* (2013.01); *C08G 18/0819* (2013.01); *C08G 18/12* (2013.01); *C08G 18/227* (2013.01); *C08G 18/3228* (2013.01); *C08G 18/348* (2013.01); *C08G 18/4833* (2013.01); *C09D 175/02* (2013.01); *C09D 175/08* (2013.01)

(58) Field of Classification Search
CPC .. C08G 18/755; C08G 18/12; C08G 18/0819; C08G 18/227; C08G 18/3228; C08G 18/348; C08G 18/4833; C09D 175/08; C09D 175/02

See application file for complete search history.

(56) References Cited

U.S. PATENT DOCUMENTS

| | | | | |
|---|---|---|---|---|
| 4,066,591 | A * | 1/1978 | Scriven | C08G 18/0804 |
| | | | | 204/489 |
| 6,100,364 | A | 8/2000 | Gaal, Jr | |
| 6,172,159 | B1 | 1/2001 | Gaal, Jr | |
| 6,776,287 | B1 * | 8/2004 | Hinde | C08G 18/0823 |
| | | | | 206/484 |
| 2015/0315325 | A1 * | 11/2015 | Tabor | C08G 18/222 |
| | | | | 524/590 |

FOREIGN PATENT DOCUMENTS

CN    106811076    *    6/2017

OTHER PUBLICATIONS

Odian, G., Principles of Polymerization, third edition, 1991, pp. 19-24.*
Machine English translation of CN 106811076, Tan, Jun. 2017.*

* cited by examiner

*Primary Examiner* — Patrick D Niland
(74) *Attorney, Agent, or Firm* — Cherskov Flaynik & Gurda, LLC

(57) ABSTRACT

An embodiment of the invention provides an anionic/nonionic water based polymer comprising polyurethane and polyurea. The polymer is approximately 30 to 40 weight percent non-volatile and has a viscosity of between approximately 1400 and 1500 cps. Also provided is a method for producing an anion/non-ionic water based polyurethane/polyurea polymer, the method comprising heating dimethylolpropionic acid; combining the dimethylolproprionic acid with heated PEG to create a slurry; adding isophorone diisocyanate (IPDI) to the slurry to create a mixture; and heating the mixture in the presence of a catalyst. The prepolymer is then salted out after catalyst is added and reaction complete. This salted prepolymer is then added to ethylene diamine in water to chain extend and promote water solubility. Also provided is a film comprising the polymer.

9 Claims, 2 Drawing Sheets

HYBRID ANIONIC, NONIONIC WATER-BASED POLYURETHANE-POLYUREA

BACKGROUND OF THE INVENTION

1. Field of the Invention

This invention relates to resins, and more specifically, this invention relates to amine rich polyurethane polyurea.

2. Background of the Invention

The global film and flexible packaging market has grown at a rate of approximately 3.5 percent annually. As one of the fastest growing segments of the packaging industry, flexible packaging combines the best qualities of plastic, film, paper and aluminum foil to deliver a broad range of protective properties while employing a minimum of material. Flexible packaging construction may be of paper, plastic film, foil or any combination of these. Product applications include roll stock, bags, pouches, labels/wraps, lidding, shrink sleeves and stretch film.

Film resins are used to coat polyester textile, structured polyethylene, glass, polyethylene film, mesh PVC, polypropylene, uncoated paper, and foil. The resulting film and packaging material is used to enclose and otherwise encapsulate food. As such, the constituents of the material must be relatively inert, nontoxic, and easy to manipulate.

Research continues to develop economical film and packaging resins to provide superior gloss, ink transfer and pigment wetting properties. However, most water-based, state of the art resins exist as emulsions or dispersions (non-homogenous mixtures) that have limited use in closed cell and nonabsorbent substrates. This is due to poor stability, adhesion and cohesion qualities. Also, these state of the art resins exhibit higher glass transition temperatures, low flexibility, and minimal elasticity.

Polyurethane polyurea is an elastomer that is derived from the reaction product of an isocyanate component, an alcohol and an amine. The isocyanate can be aromatic or aliphatic in nature. It can be a monomer, polymer, or any variant reaction of isocyanates, a quasi-prepolymer or a prepolymer. The prepolymer, or quasi-prepolymer, can be made of an amine-terminated polymer resin, or a hydroxyl-terminated polymer resin.

Resin blends may also contain additives or non-primary components. These additives may contain hydroxyls, such as pre-dispersed pigments in a polyol carrier. Normally, the resin blend does not contain a catalyst(s).

Polyurea functionality is used to promote adhesion and mechanical strength to the film to which it is applied. Additionally if co-resins are used, the urethane/ureas plasticize the co-resins without introducing the negative effects associated with the use of normal plasticizers. (For example, the problem with normal plasticizers is that they are usually never soluble in acetates.)

Generally then, the elastomeric nature of the polyurea based resins provides properties and functionalities that normal plasticizers do not. They are also used as pigment dispersants.

In summary, polyurethane/polyurea based resins provide several properties plasticizers do not, including elasticity, adhesion, and improved bond strengths in lamination.

A need exists in the art for an environmentally benign, inherently stable water-based resin that improves adhesion, and pigment dispersion capabilities. It should be relatively non-volatile and tack free. The target resins should therefore satisfy ever stringent regulatory requirements imposed on the industry.

SUMMARY OF INVENTION

An object of the invention is to provide resin systems that overcome many of the drawbacks of the prior art.

Another object of the invention is to provide an acid functional prepolymer. A feature of the invention is its neutralization or salting out of the acid functionality on the prepolymer. Specifically, a feature of the invention is the neutralization of the prepolymer by the salting out of the carboxylic acid functionality using trimethylamine. An advantage of the invention is that a hybrid of water solubilization techniques are incorporated into the structural motif of the polymer.

Still another object of the invention is to provide a prepolymer to yield tack-free characteristics. A feature of the prepolymer is that it has internal anionic and non-ionic chemistry. An advantage of the invention is that its tack-free nature allows the resin to be used alone or in combination with other commercially available resins.

Yet another object of the invention is to provide a resin with enhanced adhesion and pigment dispersion capability. A feature of the invented compound is that it is a relatively non-volatile, anionic/non-ionic water based polyurethane/polyurea. An advantage of the compound is that it generates pigment dispersions that are ultra-high in gloss and tack free, preferably when dispersion is prepared utilizing a cowles blade or media mill.

An embodiment of the invention provides non-ionic water based resin comprising polyurethane and polyurea that is approximately 30 to 40 percent non-volatile and having a viscosity of between approximately 500 and 1300 cps. Specifically, the invention provides an anionic/non-ionic water based polyurethane/polyurea polymer comprising chain extending molecules; urethane moieties flanking the hydroxyl terminated chain extending molecules; and isophorone diisocyanate-derived urea moieties distributed throughout the polymer, wherein the urea is formed when terminal isocyanate groups are consumed by reaction with ethylene diamine.

The invention further provides a method for producing an anion/non-ionic water based polyurethane/polyurea polymer, the method comprising heating dimethylolpropionic acid; combining the dimethylolproprionic acid with heated polyethylene glycol (PEG) to create a slurry; adding isophorone diisocyanate (IPDI) to the slurry to create a mixture; heating the mixture in the presence of a catalyst to generate a prepolymer, and then chain extending this prepolymer using ethylene diamine to form the amine terminated polymer. In this last step, and before the prepolymer is chain extended, the prepolymer is first salted out. This salted prepolymer is then added to ethylene diamine in water to simultaneously chain extend and promote water solubility.

The invention also provides a film comprising the aforementioned anion/non-ionic water based polyurethane/polyurea polymer.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides resins with enhanced solubility in polar solvents. The invention provides a nonionic/anionic prepolymer to reduce the tack or softness of non-ionic water-based polyurethane/poyurea resins for use in inks.

The prepolymer is designed to be as low in acid value as possible, as determined by the amounts of dimethylolpropionic acid (DMPA) present. This improves film properties. PEG 1000 is used to create the hybrid and a resin with lower acid value than is typically expected to be water soluble. PEG 500, PEG 1000, PEG 2000 and combinations thereof are suitable for enabling a balance of anionic and non-ionic properties. (The 500, 1000, and 2000 designate the average molecular weights of the PEG.)

Figure 1:
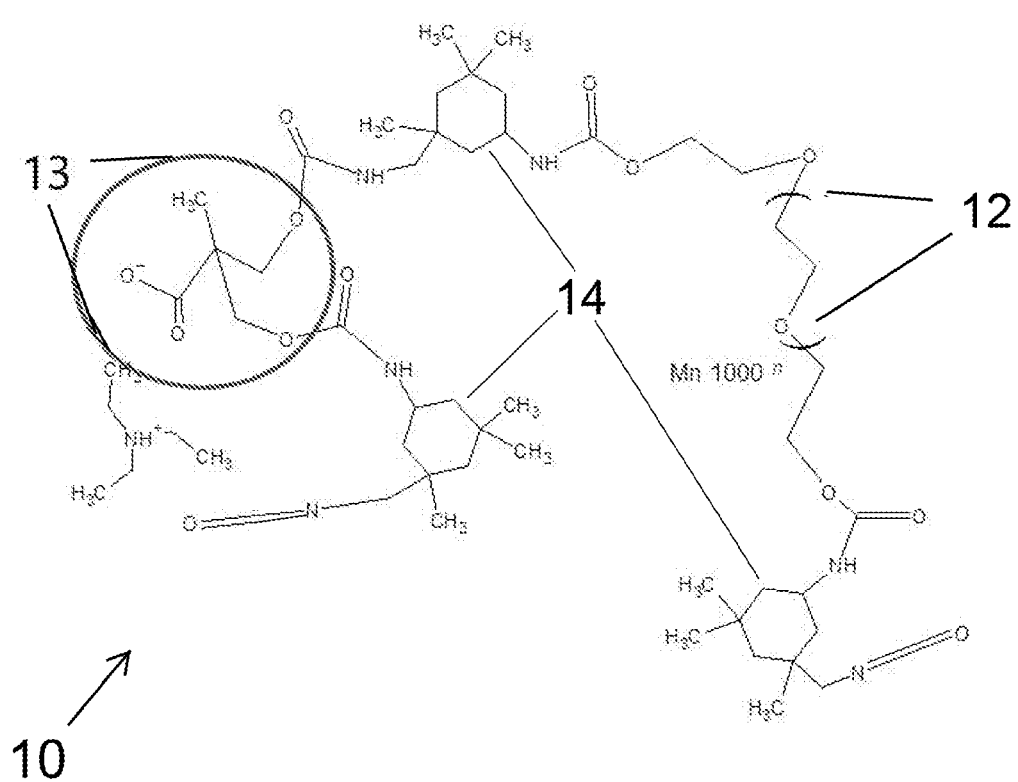
FIG. 1 is a chemical structure of prepolymer, in accordance with features of the present invention.

FIG. 1 depicts the prepolymer, generally designated as numeral 10. (The entire chain extended polymer is generally designated as numeral 11 in FIG. 2.) The prepolymer generally comprises a 1000 molecular weight polymer (i.e., a chain extending molecule) 12 and DMPA 13 flanked by isophorone diisocynate groups 14. The prepolymer bears hydroxy functional monomers, thus predominantly only polyurethane linkages exist in the prepolymer.

Figure 2:
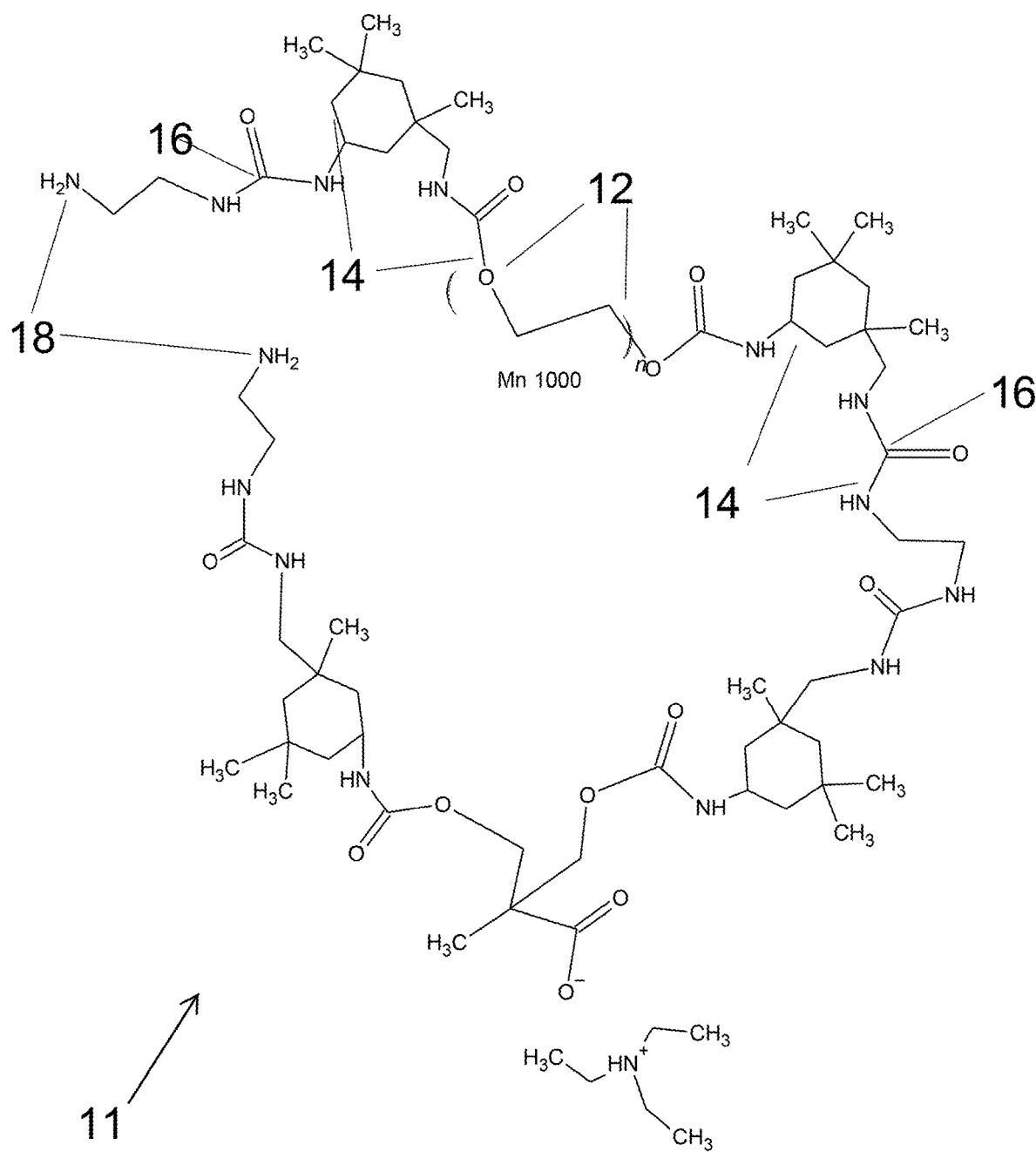
FIG. 2 is a chemical structure of an anionic/non-ionic water-based polyurethane/polyurea polymer, in accordance with features of the present invention

The invented resin blends may comprise amine-terminated polymer resins, and/or amine-terminated chain extenders. Amine-terminated polymer resins do not have any hydroxyl moieties. When there is incomplete conversion to amine terminated polymer resins, there are no free hydroxyls, only free isocyanate groups (NCO), comprising nitrogen, carbon and oxygen atoms from isocyanate. The diamine links two free terminal NCO of different polymer ends; thus the term, "chain extender." The diisocynate groups are subsequently chain extended using ethylene diamine. As depicted in FIG. 2, this provides urea 16 functionality. The first and second ends of the molecule terminate in an amine group 18.

Preparation Detail

A salient feature of the protocol is the use of DMPA in a hydroxyl/isocyanate reaction to position carboxyl groups flanking the high molecular weight polymer 12. The molecular weight of an exemplary polymer may range from between about 25000 and 35000 daltons.

Prepolymer formation chemistry is depicted in Equation 1, below:

Equation 1:

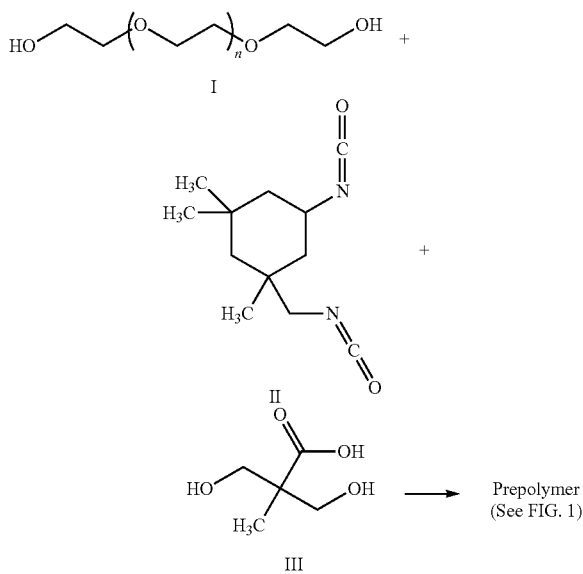

wherein compound I is molecular weight polymer, compound II is isophorone diisocyanate, and compound III is dimethylolpropionic acid (DMPA).

DMPA is first preheated (e.g., to approximately 160° F.). The DMPA may be used as received from the commercial supplier, or else sifted to a fine powder.

The DMPA is then combined with heated PEG to create a slurry. This slurry is then added to agitating isophorone diisocyanate (IPDI) and mixed. The mixture is then heated with zirconium bismuth which is used as a catalyst. Catalyst amounts are based on the amount of isocyanate present. Catalyst amounts may range from 0.05 to 5 and preferably from 0.1 to 1 percent by weight of the amount of isocyanate present. For example, catalyst amount may be 0.5 percent. A suitable commercial catalyst is XCA 209 (King Industries, Inc, Norwalk Conn.)

The resulting mixture is heated to approximately 200° F. Optionally, chillers are used to prevent overheating.

The prepolymer shown in FIG. 1 does not have polyurea functionality introduced until after chain extension.

Once the prepolymer is formed, it is salted with an amine compound. Suitable amine compounds may be primary, secondary or tertiary amines. Preferred amine compounds are tertiary amines selected from the group consisting of trimethylamine, ethyldimethylamine, trimethylamine, and combinations thereof. For example, triethylamine is added dropwise to neutralize a 1:1 equivalent of acid (DMPA). Triethylamine is added after prepolymer formation and before chain extension, the latter using EDA.

The finished product is made using deionized water and ethylene diamine (EDA).) EDA is used because the moment IPDA is introduced, the prepolymer is no longer water soluble. The prepolymer is added to an agitating mixture of the deionized water and ethylene diamine until the desired viscosity/amine value is achieved.

Cool and add dimethyl maleate DMM to reduce viscosity.
Formulation:

| DI water | 52.4-84.2 |
|---|---|
| EDA | 0.6-6.1 |
| ET$_3$N | 0.1-4.1 |
| DMM | 1.8-4.6 |
| PEG | 4.4-16.9 |
| DMPA | 0-4.0 |
| IPDI | 5.7-20.2 |

The resin has the following characteristics:
Viscosity: 1440 cps
Gardner-Holdt viscosity $Y^{-2}$
Non volatile materials (NVM) 24.3%
Color: 1
Max weight per gallon (WPG): 8.6 lb/gal Application Testing: This technology is an industrially preferred route of water solubilizing polymers (carboxylate and quaternary amine salt; water solubilization). DMPA is utilized via the hydroxyl/isocyanate reaction, to position carboxyl moieties between amino groups. This results in more stable pigment dispersions being formed.

The invented prepolymer is a film-former and has high gloss. It can be doped with the applicant's prepolymer disclosed in U.S. Provisional Patent Application No. 62/727,889 (hereinafter the '889 application), filed on Sep. 6, 2018, the entirety of which is incorporated by reference. Doping concentrations are approximately 20 weight percent or less. The doping serves to improve tack/adhesion to many substrates. The amine value of the invented is higher than that of the '889 application polymer (~10±5), but is still such that (~20±5) its amine value is considered to be low. The low amine value provides greater utility and finished resin stability.

FIG. 2 depicts a resin that is an amine-rich combination of polyurethane and polyurea. FIG. 2 depicts the polyol as PEG-1000. However, polyols between 400 MW and 8000 MW are suitable.

FIG. 2 also depicts a freely associated triethylamine molecule. It is depicted here to add clarity to the water solubilization feature of the molecule. The cation (ammonium ion from triethylamine) combines with its respective anion (the carboxylate ion from DMPA) to create the salt.

The resulting pigment dispersions are tack free (i.e., no tackiness), especially when prepared using a mill. A substance appears sticky when some work is required to remove one's finger from it. This property is known as tackiness. The feeling of tackiness is due both to the high energy dissipated during the bonding-debonding cycle, and to the high force required to separate the probe (finger) from the polymer film. Maximum tacky force ($F_{max}$) is found to be influenced by many factors, e.g., contact time, separation speed, polymer molecular weight, temperature and etc. However, there is one thing in common: when the probe separation speed (v) is greater than a critical speed ($v_c$), the force $F_{max}$ can be described by a power function $F_{max}$ $t_{max}^{-}$ ½, where $t_{max}$ is the time corresponding to the maximum force at constant separation.

The invented polymer may be used as an adhesion promoting primer as well as to improve the flexibility of coatings for inks. Inks based on the invented compound create an ultra-high gloss having superior hide capabilities, particularly for clear or other than white colors.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for producing an anion/non-ionic water soluble polyurethane polymer, the method comprising:
   a) heating dimethylolpropionic acid;
   b) combining the dimethylolproprionic acid with heated PEG to create a slurry;
   c) adding isophorone diisocyanate to the slurry to create a mixture;
   d) heating the mixture in the presence of a catalyst to create isocyanate-containing prepolymers; and
   e) linking the isocyanate-containing prepolymers with an amine to create urea linkages between the isocyanate-containing prepolymers.

2. The method as recited in claim 1 wherein the catalyst is an inorganic compound selected from the group consisting of zirconium bismuth, bismuth carboxylate, zirconium carboxylate and combinations thereof.

3. The method as recited in claim 1 wherein catalyst amounts range from 0.1 to 1 percent by weight of isocyanate present.

4. The method as recited in claim 1 wherein the step of heating the mixture in the presence of a catalyst further comprises maintaining the mixture at about 200° F.

5. The method as recited in claim 1 wherein the linking step comprises neutralizing the prepolymer to create a polymer.

6. The method as recited in claim 5 wherein the step of neutralizing comprises mixing the mixture with an amine compound selected from the group consisting of triethyl amine, ethyldimethylamine, trimethylamine, and combinations thereof.

7. The method as recited in claim 1 wherein the amine compound is added to a 1:1 equivalent based on the dimethylolpropionic acid present.

8. The method as recited in claim 5 wherein the neutralized prepolymers are added to a stirring solution of ethylene diamine in water to simultaneously chain extend and confer water solubility to the polymer.

9. The method as recited in claim 8 wherein the water is deionized.

* * * * *